(12) United States Patent
Bhamri et al.

(10) Patent No.: US 11,178,647 B2
(45) Date of Patent: Nov. 16, 2021

(54) SIGNALING SUPPORT FOR UPLINK REFERENCE SIGNAL TRANSMISSION

(71) Applicant: Nokia Technologies Oy, Espoo (FI)

(72) Inventors: Ankit Bhamri, Helsinki (FI); Timo Erkki Lunttila, Espoo (FI); Juha Sakari Korhonen, Espoo (FI); Karol Schober, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 305 days.

(21) Appl. No.: 16/318,110

(22) PCT Filed: Aug. 8, 2016

(86) PCT No.: PCT/US2016/046001
§ 371 (c)(1),
(2) Date: Jan. 15, 2019

(87) PCT Pub. No.: WO2018/030981
PCT Pub. Date: Feb. 15, 2018

(65) Prior Publication Data
US 2021/0076371 A1    Mar. 11, 2021

(51) Int. Cl.
*H04W 72/04* (2009.01)
*H04W 76/27* (2018.01)
(Continued)

(52) U.S. Cl.
CPC ....... *H04W 72/0413* (2013.01); *H04L 5/0048* (2013.01); *H04L 25/0226* (2013.01);
(Continued)

(58) Field of Classification Search
CPC ............. H04L 25/0226; H04L 27/2636; H04L 5/0048; H04W 64/006; H04W 72/0413; H04W 72/14; H04W 76/27; H04W 88/06
See application file for complete search history.

(56) References Cited

U.S. PATENT DOCUMENTS

| 2003/0169722 A1 | 9/2003 | Petrus et al. |
| 2015/0188650 A1* | 7/2015 | Au .................. H04L 5/0005 370/312 |

(Continued)

FOREIGN PATENT DOCUMENTS

| CN | 1703851 A | 11/2005 |
| CN | 102057612 B | 7/2014 |

(Continued)

OTHER PUBLICATIONS

Lee et al. "Method of PUSCH DM-RS Design for Latency Reduction", May 8, 2016, LG Electronics Inc., U.S. Appl. No. 62/333,259, Total Pages: 55 (Year: 2016).*

(Continued)

*Primary Examiner* — Shah M Rahman
(74) *Attorney, Agent, or Firm* — Squire Patton Boggs (US) LLP

(57) ABSTRACT

Various communication systems may benefit from a reduction in latency. For example, communication systems may benefit from an improved transmission of an uplink reference signal in an uplink channel. A method, in certain embodiments, includes determining by a user equipment a candidate location of a transmission of an uplink reference signal in a channel. The method also includes determining by the user equipment a triggering window associated with the candidate location of the transmission of the uplink reference signal in the channel. In addition, the method includes receiving an uplink grant for a data transmission from a base station. Further, the method includes transmitting the uplink reference signal based on the uplink grant being at least partially within the triggering window.

20 Claims, 5 Drawing Sheets

(51) Int. Cl.
*H04L 5/00* (2006.01)
*H04L 25/02* (2006.01)
*H04L 27/26* (2006.01)
*H04W 64/00* (2009.01)
*H04W 72/14* (2009.01)
*H04W 88/06* (2009.01)

(52) U.S. Cl.
CPC ....... *H04L 27/2636* (2013.01); *H04W 64/006* (2013.01); *H04W 72/14* (2013.01); *H04W 76/27* (2018.02); *H04W 88/06* (2013.01)

(56) References Cited

U.S. PATENT DOCUMENTS

| | | | |
|---|---|---|---|
| 2016/0278050 A1* | 9/2016 | Nory | H04L 5/0051 |
| 2016/0323874 A1* | 11/2016 | Pajukoski | H04L 5/0005 |
| 2018/0049165 A1* | 2/2018 | Byun | H04L 5/0053 |
| 2018/0302900 A1* | 10/2018 | Ibars Casas | H04W 72/042 |
| 2018/0376495 A1* | 12/2018 | Lee | H04W 72/1289 |
| 2019/0028162 A1* | 1/2019 | Lee | H04B 7/0486 |
| 2019/0037554 A1* | 1/2019 | Gao | H04L 5/0055 |
| 2019/0098622 A1* | 3/2019 | Lee | H04W 72/0446 |
| 2019/0215856 A9* | 7/2019 | Nory | H04L 1/1893 |
| 2019/0223204 A1* | 7/2019 | Kim | H04B 1/00 |

FOREIGN PATENT DOCUMENTS

| | | |
|---|---|---|
| CN | 104105200 A | 10/2014 |
| WO | 2013/149664 A1 | 10/2013 |
| WO | 2015/190847 A1 | 12/2015 |
| WO | 2017/056020 A1 | 4/2017 |

OTHER PUBLICATIONS

3GPP et al. "3rd Generation Partnership Project; Technical Specification Group Radio Access Network; Evolved Universal Terrestrial Radio Access (E-UTRA); Study on latency reduction techniques for LTE", Jun. 2016, 3GPP, 3GPP TR 36.881 V14.0.0 (Jun. 2016), pp. 19-20, Total Pages: 2 (Year: 2016).*

Office action received for corresponding European Patent Application No. 16791128.8, dated Sep. 7, 2020, 8 pages.

"UL Channel Design for Shortened TTI", 3GPP TSG RAN WG1 #85, R1-164459, Agenda : 6.2.10.1, Qualcomm Incorporated, May 23-27, 2016, pp. 1-8.

"New SI Proposal: Study on Latency Reduction Techniques for LTE", 3GPP TSG-RAN meeting #67, RP-150465, Agenda: 13.1.2, Ericsson, Mar. 9-12, 2015, 8 pages.

"3rd Generation Partnership Project; Technical Specification Group Radio Access Network; Evolved Universal Terrestrial Radio Access (E-UTRA); Study on latency reduction techniques for LTE (Release 14)", 3GPP TR 36.881, V14.0.0, Jun. 2016, 249 pages.

"New Work Item on Shortened TTI and Processing Time for LTE", 3GPP TSG-RAN meeting #72, RP-161299, Agenda: 10.1.1, Ericsson, Jun. 13-16, 2016, 9 pages.

International Search Report and Written Opinion received for corresponding Patent Cooperation Treaty Application No. PCT/US2016/046001, dated May 3, 2017, 23 pages.

"On Two-Stage UL scheduling for eLAA", 3GPP TSG-RAN Working Group 1 meeting #85, R1-164942, Agenda: 6.2.1.1, Nokia, May 23-27, 2016, 8 pages.

"Control details for UL scheduling in eLAA", 3GPP TSG-RAN Working Group 1 meeting #85, R1-164409, Agenda: 6.2.1.1, Qualcomm Incorporated, May 23-27, 2016, pp. 1-4.

"SRS Configurations for eLAA", 3GPP TSG-RAN Working Group 1 meeting #85, R1-164074, Agenda: 6.2.1.2, Huawei, May 23-27, 2016, 4 pages.

Office action received for corresponding Chinese Patent Application No. 201680087369.8, dated Oct. 28, 2020, 6 pages of office action and 3 pages of translation available.

"DCI design for PUSCH scheduling in Elaa", 3GPP TSG RAN WG1 #85, R1-164410, Agenda item: 6.2.1.1, Qualcomm Incorporated, May 23-27, 2016, pp. 1-4.

* cited by examiner

SIGNALING SUPPORT FOR UPLINK REFERENCE SIGNAL TRANSMISSION

RELATED APPLICATION

This application was originally filed as PCT Application No. PCT/US2016/046001 on Aug. 8, 2016.

BACKGROUND

Field

Various communication systems may benefit from a reduction in latency. For example, communication systems may benefit from improved transmission of an uplink reference signal with shortened transmission time intervals.

Description of the Related Art

Certain embodiments relate to latency reduction in Long Term Evolution (LTE), LTE-Advanced (LTE-A), or other 3rd Generation Partnership Project (3GPP) technology. Processing time reduction may help to improve latency associated with the physical layer. The use of short Transmission Time Interval (sTTI) can be used to reduce such processing times. TTI may be a time interval within a subframe that may be used to transmit data through a transport channel. An sTTI, on the other hand, may be a TTI having a shorter duration. For example, while a TTI may be 1 millisecond (ms) long including 14 OFDM/DFT-S-OFDMA symbols, occupying one full subframe, an sTTI may only include 2 OFDM/DFT-S-OFDMA symbols long.

A frame structure may be used for transmission within a radio access network. Some frame structures provide support for a frame based on a 2-symbol sTTI, and 1-slot for either a short physical downlink shared channel (sPDSCH) or a short physical downlink control channel (sPDCCH). 1-slot in the subframe may be 7-symbols, for example, and there may be two slots in each subframe. The frame structure may also allow for a transmission duration based on a 2 or 4 symbol sTTI, and 1-slot sTTI for either a short physical uplink shared channel (sPUSCH) or a short physical uplink control channel (sPUCCH).

In embodiments involving sTTI, performance in link level throughput decreases. The sTTI can increase the relative overhead caused by the transmission of an uplink (UL) demodulation reference signal (DMRS), especially when DMRS are transmitted in every sTTI. Therefore, sharing the UL DMRS between sTTIs can help mitigate this performance loss. In other words, multiple sTTIs using the same DMRS may help mitigate the performance loss caused by the use of sTTI. As an example, having DMRS in every second or third sTTI can result in significant increase in a throughput.

SUMMARY

A method, in certain embodiments, may include determining by a user equipment a candidate location of a transmission of an uplink reference signal in a channel. The method may also include determining by the user equipment a triggering window associated with the candidate location of the transmission of the uplink reference signal in the channel. In addition, the method may include receiving an uplink grant for a data transmission from a base station. Further, the method may include transmitting the uplink reference signal based on the uplink grant being at least partially within the triggering window.

According to certain embodiments, an apparatus may include at least one memory including computer program code, and at least one processor. The at least one memory and the computer program code may be configured, with the at least one processor, to cause the apparatus at least to determine by a user equipment a candidate location of a transmission of an uplink reference signal in a channel. The at least one memory and the computer program code may also be configured, with the at least one processor, at least to determine by the user equipment a triggering window associated with the candidate location of the transmission of the uplink reference signal in the channel. In addition, the at least one memory and the computer program code may also be configured, with the at least one processor, at least to receive an uplink grant for a data transmission from a base station. Further, the at least one memory and the computer program code may also be configured, with the at least one processor, at least to transmit the uplink reference signal based on the uplink grant being at least partially within the triggering window.

An apparatus, in certain embodiments, may include means for determining by a user equipment a candidate location of a transmission of an uplink reference signal in a channel. The apparatus may also include means for determining by the user equipment a triggering window associated with the candidate location of the transmission of the uplink reference signal in the channel. In addition, the apparatus may include means for receiving an uplink grant for a data transmission from a base station. Further, the apparatus may include means for transmitting the uplink reference signal based on the uplink grant being at least partially within the triggering window.

According to certain embodiments, a non-transitory computer-readable medium encoding instructions that, when executed in hardware, perform a process. The process may include determining by a user equipment a candidate location of a transmission of an uplink reference signal in a channel. The process may also include determining by the user equipment a triggering window associated with the candidate location of the transmission of the uplink reference signal in the channel. In addition, the process may include receiving an uplink grant for a data transmission from a base station. Further, the process may include transmitting the uplink reference signal based on the uplink grant being at least partially within the triggering window.

According to certain embodiments, a computer program product encoding instructions for performing a process according to a method including determining by a user equipment a candidate location of a transmission of an uplink reference signal in a channel. The method may also include determining by the user equipment a triggering window associated with the candidate location of the transmission of the uplink reference signal in the channel. In addition, the method includes receiving an uplink grant for a data transmission from a base station. Further, the method can include transmitting the uplink reference signal based on the uplink grant being at least partially within the triggering window.

A method, in certain embodiments, may include determining by a base station a triggering window associated with a candidate location of a transmission of an uplink reference signal in a channel. The method may also include transmitting from the base station to a user equipment an uplink grant for a data transmission. In addition, the method may include receiving the data transmission and the uplink reference signal from the user equipment. The uplink reference signal is transmitted based on the uplink grant being within the triggering window. Further, the method may include performing a channel estimation based on the uplink reference signal. The method can also include using the channel estimation to demodulate the data transmissionestimation.

According to certain embodiments, an apparatus may include at least one memory including computer program code, and at least one processor. The at least one memory and the computer program code may be configured, with the at least one processor, to cause the apparatus at least to determine by a base station a triggering window associated with a candidate location of a transmission of an uplink reference signal in a channel. The at least one memory and the computer program code may also be configured, with the at least one processor, at least to transmit from the base station to a user equipment an uplink grant for a data transmission. In addition, the at least one memory and the computer program code may be configured, with the at least one processor, at least to receive the data transmission and the uplink reference signal from the user equipment. The uplink reference signal is transmitted based on the uplink grant being at least partially within the triggering window. Further, the at least one memory and the computer program code may be configured, with the at least one processor, at least to perform a channel estimation based on the uplink reference signal. The at least one memory and the computer program code may also be configured, with the at least one processor, at least to use the channel estimation to demodulate the data transmission.

An apparatus, in certain embodiments, may include means for determining by a base station a triggering window associated with a candidate location of a transmission of an uplink reference signal in a channel. The apparatus may also include means for transmitting from the base station to a user equipment an uplink grant for a data transmission. In addition, the apparatus may include means for receiving the data transmission and the uplink reference signal from the user equipment. The uplink reference signal is transmitted based on the uplink grant being at least partially within the triggering window. Further, the apparatus may include means for performing a channel estimation based on the uplink reference signal. The apparatus may also include means for using the channel estimation to demodulate the data transmission.

According to certain embodiments, a non-transitory computer-readable medium encoding instructions that, when executed in hardware, perform a process. The process may include determining by a base station a triggering window associated with a candidate location of a transmission of an uplink reference signal in a channel. The process may also include transmitting from the base station to a user equipment an uplink grant for a data transmission. In addition, the process may include receiving the data transmission and the uplink reference signal from the user equipment. The uplink reference signal is transmitted based on the uplink grant being at least partially within the triggering window. Further, the process may include performing a channel estimation based on the uplink reference signal. The process may also include using the channel estimation to demodulate the data transmission.

According to certain embodiments, a computer program product encoding instructions for performing a process according to a method including determining by a base station a triggering window associated with a candidate location of a transmission of an uplink reference signal in a channel. The method may also include transmitting from the base station to a user equipment an uplink grant for a data transmission. In addition, the method may include receiving the data transmission and the uplink reference signal from the user equipment. The uplink reference signal is transmitted based on the uplink grant being at least partially within the triggering window. Further, the method may include performing a channel estimation based on the uplink reference signal. The method may also include using the channel estimation to demodulate the data transmission.

BRIEF DESCRIPTION OF THE DRAWINGS

For proper understanding of the invention, reference should be made to the accompanying drawings, wherein.

DETAILED DESCRIPTION

Certain embodiments may help to facilitate efficient sharing of UL DMRS amongst a plurality of sTTIs. For example, certain embodiments can determine rules and related signaling that can be used for facilitating the efficient transmission of DMRS with sTTI operations. Some embodiments may also allow for a constant number of resources to be available for data transmission in every sTTI. A data transmission may also be referred to as a sTTI transmission. By facilitating the efficient transmission of UL DMRS, the overhead of the UL operations may be lowered. While many embodiments discussed below refer to DMRS, the embodiments discussed herein may utilize any reference signal, including a sounding reference signal (SRS).

Figure 1:
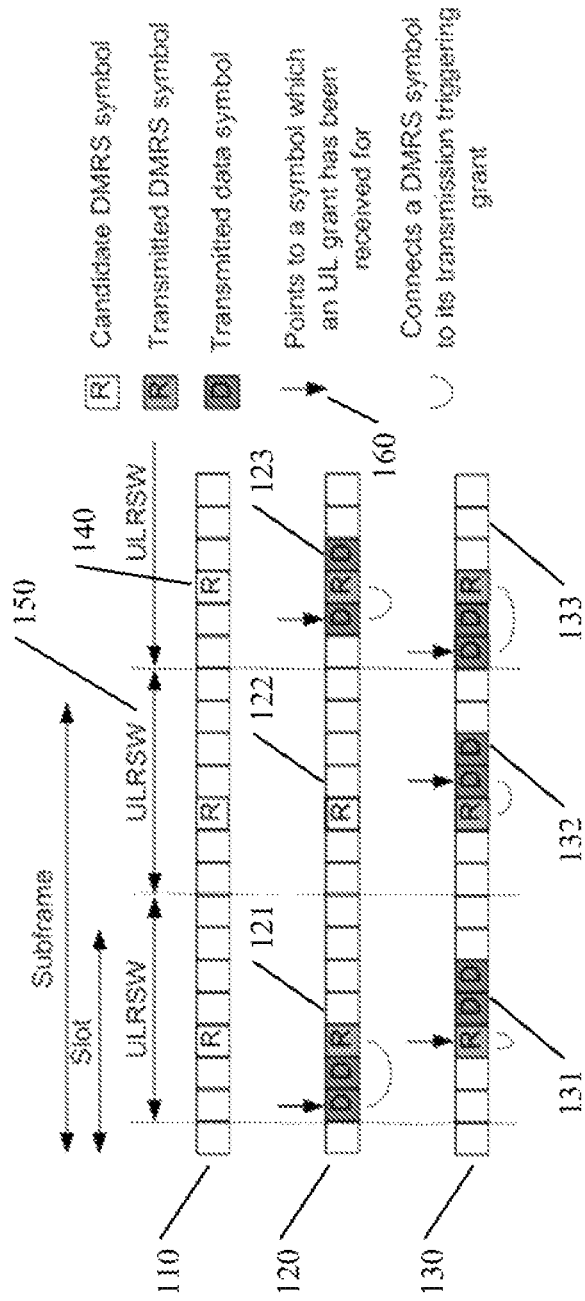
FIG. 1 illustrates a diagram according to certain embodiments.

FIG. 1 illustrates a diagram according to certain embodiments. In particular, FIG. 1 illustrates subframes 110, 120, and 130, which may include a plurality of discrete Fourier transform spread orthogonal frequency-division multiplexing (DFT-S-OFDM) symbols. Each subframe may include a plurality of sTTIs. A slot may be equal to a half of a subframe. If a subframe has 14 DFT-S-OFDM symbols, a slot may include 7 symbols. An sTTI, on the other hand, may have a duration of one slot, or may be shorter than one slot. While certain embodiments may include a plurality of sTTIs, other embodiments may be application to a plurality of TTIs. As previously discussed, the sTTIs may be used to define a duration of transmission within a subframe, which may be used to transmit transport blocks of data or control signals in a channel. For example, an sTTI may define the time duration for a given data transmission or a DMRS transmission.

In FIG. 1, a single sTTI may correspond to any number of DFT-S-OFDM symbols ranging between 1 and 7. A symbol, for example, may be a DFT-S-OFDM symbol. Each of subframes 110, 120, and 130 can include 14 DFT-S-OFDM symbols therein.

As can be seen in FIG. 1, each subframe can include at least one candidate DMRS location 140, which is also referred to as the candidate location. The candidate location in FIG. 1 may correspond to one or more DFT-S-OFDM symbol. In certain embodiments, the user equipment from which the UL DMRS is transmitted may determine the candidate location. The candidate location 140 may be predetermined by standard specification to a certain time and/or frequency instance, such as a specific slot within the subframe or a DFT-S-OFDM symbol within the subframe. The candidate location may also be configured by a network operator in some embodiment. For example, as shown in subframe 110, the operator may set candidate locations 140 to DFT-S-OFDM symbols 3 and 10. These set candidate locations in sTTI may mimic the potential locations of DRMS transmissions used with a normal TTI.

In other embodiments, a base station or a network node, such as an eNodeB (eNB), may indicate at least one candidate location 140 to the user equipment. The base station may send the indication to the user equipment upon the enablement of sTTI operations. The enablement of the sTTI operations may, for example, be a part of a Radio Resource Control (RRC) signaling message. A bitmap may be used to aid the user equipment in determining at least one candidate location. Once the user equipment receives the indication from the base station it may check with the bitmap to determine which of the slots or symbols in the subframe may be candidate locations. The bitmap may include 14 bits, one bit for every DFT-S-OFDM symbol in the subframe. Each bit may be set to a value of "1", which may indicate a candidate position for UL DMRS transmissions.

In addition to determining candidate locations, the user equipment may also determine a triggering window of the UL DMRS transmission (ULRSW) associated with each candidate location. ULRSW can include a plurality of DFT-S-OFDM symbols or sTTIs. The DFT-S-OFDM symbols or sTTIs belonging to a ULRSW may be adjacent to each other. In FIG. 1, ULRSW 150 can include seven DFT-S-OFDM symbols, which encompasses half of a subframe having fourteen symbols. In certain embodiment, each ULRSW may include at least one candidate location. In other embodiments, however, no candidate locations may be provided. Further, in some embodiments, all of the ULRSW triggering windows in a subframe may have the same number of candidate locations, while in other embodiments at least two of the ULRSW triggering windows in a subframe may have a different number of candidate locations.

As seen in FIG. 1, ULRSW may include a number of DFT-S-OFDM symbols before and/or after the UL DMRS candidate location. The number may be as few as one symbol, and as many as one symbol fewer than the number of symbols included in the whole subframe. For example, if a subframe has fourteen symbols, the ULRSW may include as few as one symbol, and as many as thirteen symbols, depending on the candidate location.

In some embodiments, the ULRSW may be configured by the operator or fixed by a predetermined standard. For example, the operator or the standard may specify that the triggering window will include seven symbols in a subframe. A location of the ULRSW may also be fixed by the operator or a standard. For example, the operator may specify that a four symbol ULRSW will be located between the second and fifth symbol in a subframe.

In other embodiments, the ULRSW may be determined and/or configured by the base station, such as an eNB. The base station may determine the size, duration, and/or location of the ULRSW associated with the candidate location. In certain embodiments, the base station may inform the user equipment of at least one of the size, duration, or location of the ULRSW using radio resource control (RRC) signaling. In other embodiments, the base station may inform the user equipment using any other method. In yet another embodiment, a network entity other than the base station may determine and/or inform the user equipment of at least one of the size, duration, or location of the ULRSW.

The user equipment may receive a first UL grant for transmitting data on a physical uplink shared channel (PUSCH) or a short PUSCH (sPUSCH). The UL grant may be received by the user equipment in the form of downlink control information (DCI). The UL grant may specify which resources, for example slots, DFT-S-OFDM symbols, or sTTIs, in the subframe will be reserved or dedicated for data transmission from the user equipment. In certain embodiments, the UL grant may fall at least partially within the ULRSW associated with the UL DMRS. For example, when the ULRSW ranges between the third symbol and eighth symbol of a subframe, if the UL grant is located on the fourth symbol of the subframe the UL grant can be said to fall within the ULRSW triggering window. In yet another example, the UL grant may be located in the second and third symbols of the subframe. If the ULRSW ranges between the third and eight symbol, the UL grant can be said to fall partially within the ULRSW.

In certain embodiments, when the UL grant falls at least partially within a given ULRSW, the user equipment may transmit the UL DMRS at the candidate location or locations within the given ULRSW. In FIG. 1, R represents the candidate location, and D represents a symbol in which data is being transmitted. An arrow 160 in FIG. 1 represents the first symbol of a sTTI within the subframe to which an UL grant has been received by the user equipment. As shown in the embodiment of FIG. 1, each UL grant may allocate 2 symbols for data transmission. In other embodiments, the UL grant may allocate any number of symbols within the subframe for data transmission. For example, in FIG. 1 an UL grant falls within ULRSW 121. Similarly, another UL grant falls within ULRSW 123. DMRS may therefore be transmitted in both of the candidate locations in ULRSW 121 and 123. On the other hand, no UL grant was received within ULRSW 122. Therefore, the DMRS may not be transmitted in the candidate location within ULRSW 122. In other words, a UL grant which at least partially overlaps or falls within the ULRSW may act as a trigger for the transmission of the UL DMRS.

The UL grant, in some embodiment, may coincide or conflict with a candidate location of the UL DMRS. An example of such an embodiment can be seen in ULRSW 131 in FIG. 1. When such a coinciding or conflict occurs, the start of the PUSCH data transmission may skip the slot or symbol of the candidate location, and move to the next available slot or symbol in the subframe. In other words, the PUSCH data transmission may be postponed, delayed, or relocated, to the next available slot or DFT-S-OFDM symbol in the subframe. Following, the transmission of the UL DRMS in the candidate location, the user equipment may transmit the data. In other embodiments, when the UL grant and the candidate location coincide or conflict, the data transmission may be advanced, moved, or relocated to an available symbol or slot before the candidate location. In other embodiments, collision may result in dropping the colliding data symbol or complete sTTI, which may result in variable duration of sTTI. For example, when a collision occurs, as shown in ULRSW 131 of FIG. 1, the user equipment may only send the DMRS, without sending the data transmission.

According to certain embodiments, the base station, for example eNB, can indicate along with the UL grant whether the UL data transmission should start at its nominal location within the subframe. The nominal location may be the slot or sTTI boundary. For example, in the case of a 7-symbol sTTI, the nominal location may be located in symbol number zero or symbol number seven. With a 2-symbol sTTI, the nominal location may be in symbols number zero, two, four, six, eight, ten, or twelve. On the other hand, with a 4-symbol sTTI, the nominal locations may be in symbols zero, three, seven, or ten. The candidate location and nominal location may coincide or conflict, in certain embodiment. If such a conflict occurs, the sTTI data transmission may be postponed, advanced, or dropped. In some embodiments, the nominal location may be counted from the last symbol of a channel, such as a PDCCH, where the UL grant has been transmitted, rather than being counted from symbol number zero in the sTTI.

In other embodiments, the base station may indicate along with the UL grant whether the UL data transmission should be postponed, relocated, or moved by at least one DFT-S-OFDM symbol. The base station may indicate to the user equipment to start the UL data transmission at the nominal location or to postpone, relocate, or move the UL data transmission in order to prevent the UL data transmission from coinciding or conflicting with a candidate location of the UL DMRS. In certain other embodiments, such as ULRSW 123 shown in FIG. 1, the UL data transmission may start at its nominal location. The data transmission, however, may be interrupted in the middle for the transmission of the UL DMRS. The user equipment may then resume UL data transmission after the UL DMRS. In some embodiments, the base station may indicate to the user equipment that the data transmission may be interfered with in order to transmit the UL DMRS.

In certain embodiments, the bandwidth and/or resource allocation of the UL DMRS may follow the bandwidth of the associated PUSCH or sPUSCH. This can allow the UL DMRS to be transmitted through the PUSCH or sPUSCH, without having to establish a separate channel or indication for the transmission of the UL DMRS.

In some embodiments, a connection may be established between the UL DMRS transmission in a ULRSW, and the UL grant in the same ULRSW. This connection allows the UL grant to act as a trigger for the transmission of the UL DMRS. As shown in the embodiment of FIG. 1, the user equipment receives an UL grant in each of ULRSW 121, 123, 131, 132, and 133, and then transmits both the data and the UL DMRS.

For example, in ULRSW 121 and ULRSW 133 the UL grant is received by the user equipment, and the second DFT-S-OFDM symbol in the subframe may be assigned for data transmission. The user equipment will then transmit data in both the second and third symbols of the subframe. The fourth symbol in the ULRSW, however, can be a candidate location, dedicated or reserved for the transmission of the UL DMRS. In ULRSW 123, on the other hand, the data is transmitted in one DFT-S-OFDM symbol before and one symbol after the candidate location. Meanwhile, in ULRSW 131 and ULRSW 132 the data is transmitted in the two DFT-S-OFDM symbols after the candidate location.

In certain embodiments, as shown in FIG. 1, the number of data symbols transmitted within each ULRSW may be consistent. In other words, the subframe or sTTI may always contain a constant number of resources available for data transmission. For example, two symbols in each of the ULRSW triggering windows in FIG. 1 may be used for the transmission of data. Alternatively, in some other embodiments, the number of symbols in each of the ULRSW triggering windows used for data transmission may differ.

Figure 2:
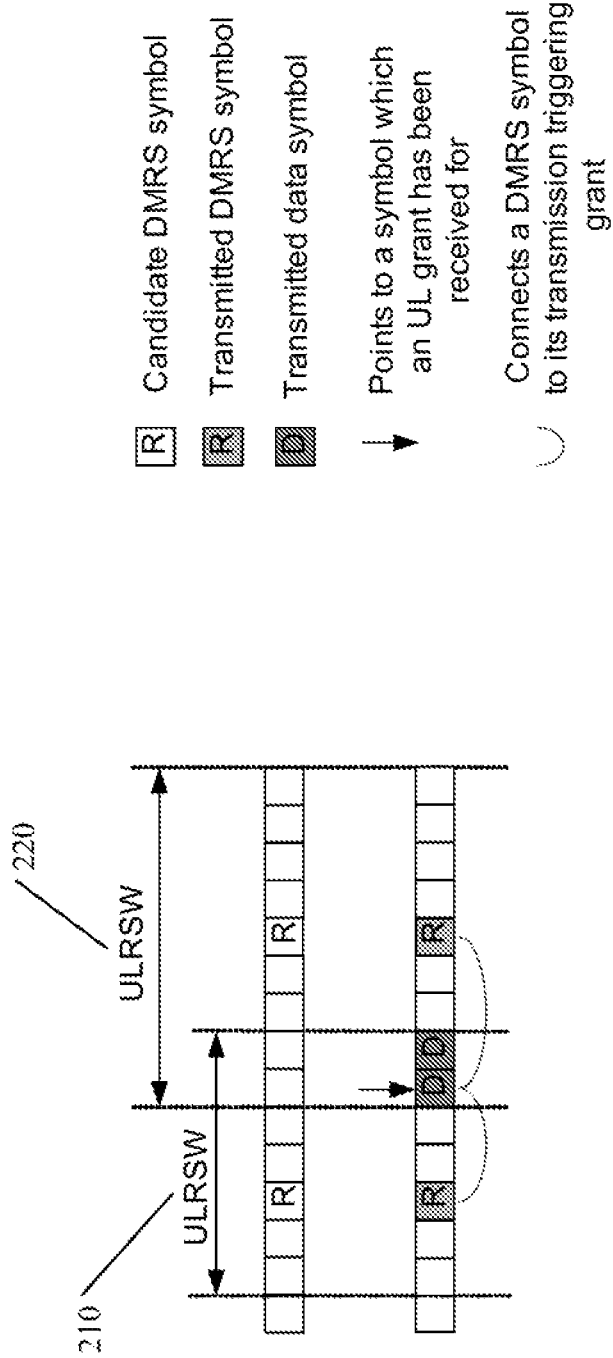
FIG. 2 illustrates a diagram according to certain embodiments.

FIG. 2 illustrates a diagram according to certain embodiments. In particular, FIG. 2 illustrates an embodiment in which two ULRSWs overlap. In other embodiments three or more ULRSWs may overlap. As seen in FIG. 2, ULRSW 210 and ULRSW 220 have two overlapping symbols. An UL grant may then be received at the user equipment that reserves at least one of the overlapping symbols for data transmission. In such an embodiment, the UL grant in the overlapping symbols of ULRSW 210 and ULRSW 220 may act to trigger the transmission of the respective UL DMRS in both ULRSW 210 and ULRSW 220. Therefore, a single UL grant may act to trigger the transmission of UL DMRS in at least two different ULRSWs.

The above embodiments, may improve channel estimation by interpolation, which could be desirable for reception of sTTI data transmissions that take place far away from an UL DMRS, for example when sTTI data transmissions occur in the middle of two candidate locations. On the other hand, triggering of only one DMRS transmission would be sufficient for a sTTI that is close to an UL DMRS candidate location.

In certain embodiments, the placement of ULRSW, in relation to the candidate location, may account for the processing times of the user equipment and/or the base station. For example, moving ULRSW earlier in the subframe can translate to less processing time for the base station because of the longer waiting time for the reference signal from the user equipment. The reference signal from the user equipment may indicate to the base station the candidate location of the UL DMRS transmission. While the timing at the base station may be impacted as a consequence of moving the ULRSW earlier, the timing may not be an issue when the UL asynchronous hybrid automatic retransmission request (HARQ) is assumed, as concluded in Study Items RP-150465 and RP-161299 of TR 36.881. Study Items RP-150465 and RP-161299 of 3GPP TR 36.881 are hereby incorporated by reference in their entirety.

Moving ULRSW later, in certain embodiments, may lead to shorter user equipment processing times for reference signal transmissions. The duration from the candidate DMRS location to the end of the corresponding ULRSW may in some embodiments correspond to the time that the user equipment may prepare the transport block after it has decoded the UL grant. In some embodiments, the user equipment may be ready for DMRS transmission as soon as the UL grant is decoded. In other words, the user equipment may be ready for DMRS transmission nearly instantaneously after receiving the UL grant. As illustrated in ULRSW 131 of FIG. 1, for example, if the UL grant allows for a timing of four sTTIs or symbols after the UL grant for PUSCH transmission, the user equipment may already transmit the DMRS a few symbols before the data so that there can be unused symbols between the DMRS and the data transmission. In other words, if the user equipment receives the UL grant at the end of the ULRSW, there may be some empty symbols between the DMRS and the data.

Figure 3:
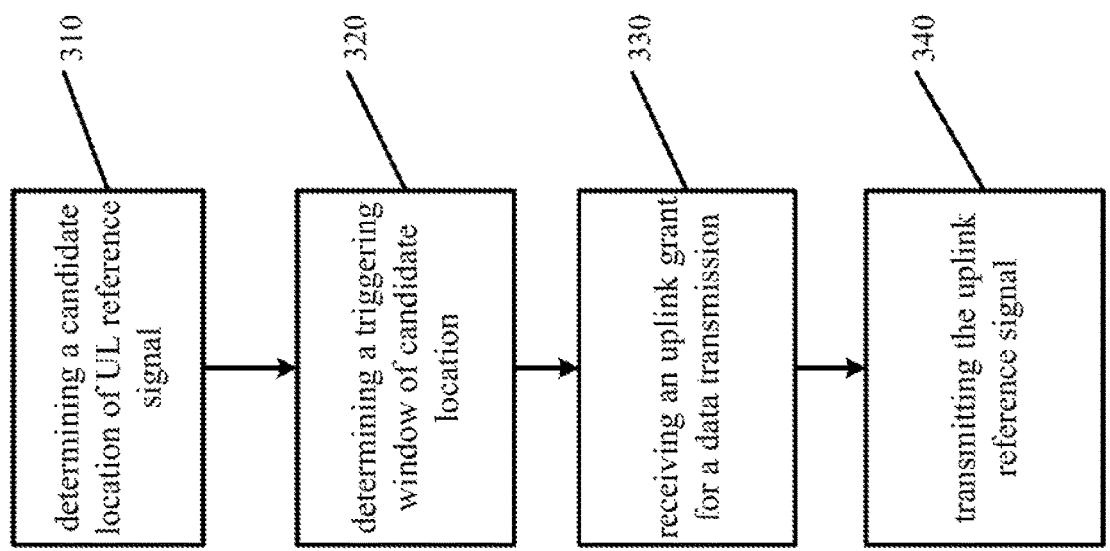
FIG. 3 illustrates a flow diagram according to certain embodiments.

FIG. 3 illustrates a flow diagram according to certain embodiments. Specifically, FIG. 3 may illustrate a flow diagram from the perspective of the user equipment. In step 310, the user equipment may determine a candidate location of a transmission of an UL reference signal in a channel. The reference signal may be, for example, a DMRS or an SRS. The channel, for example, may be a PUSCH channel. The candidate location may be predetermined by a standard, or may be received from the base station as a part of a RRC signal. The user equipment may also determine a triggering window associated with the candidate location of the transmission of the UL reference signal, as shown in step 320.

The size and location of the triggering window may be predetermined or set by the operator or by a standard. In other embodiments, the size and location of the triggering window may be received by the user equipment from the base station.

In step 330, the user equipment may receive an UL grant for data transmission in the channel, for example, a sPUSCH. The UL grant may be in the form of a DCI. The user equipment may then determine the triggering window that corresponds to the UL grant, and transmit the UL reference signal based on the UL grant being at least partially within the triggering window. In other words, when the UL grant falls at least partially within the triggering window, the user equipment may transmit the UL reference signal in the candidate location associated with the triggering window. In certain embodiments, the candidate location may be a symbol within the triggering window.

Figure 4:
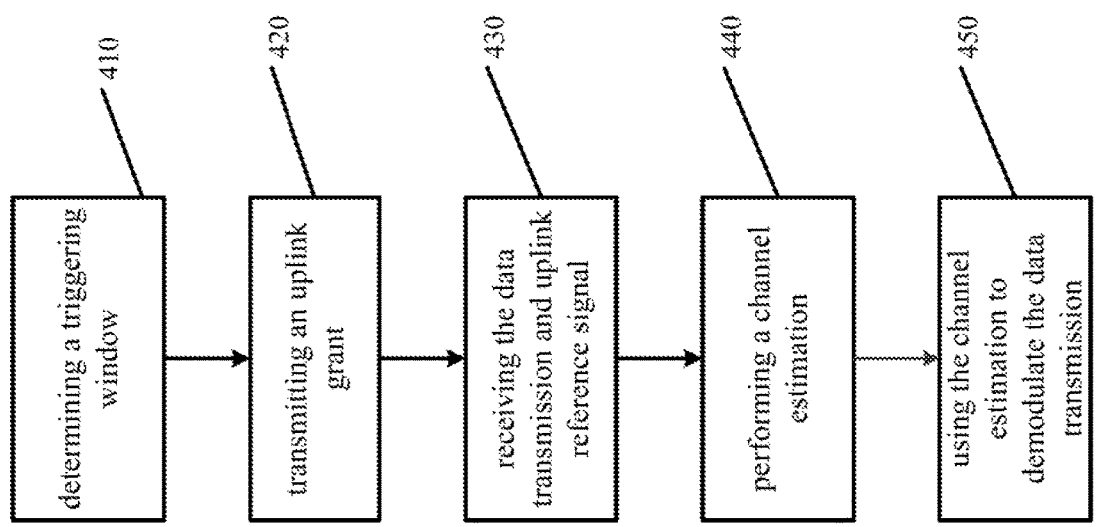
FIG. 4 illustrates a flow diagram according to certain embodiments.

FIG. 4 illustrates a flow diagram according to certain embodiments. Specifically, FIG. 4 may illustrate a flow diagram from the perspective of the base station. In step 410, the base station may determine a triggering window. The triggering window may be associated with a candidate location of a transmission of an UL reference signal in a channel. The base station may transmit the size or location of the triggering window to the user equipment. In certain embodiments, the base station may use RRC signaling. In some embodiments, the base station may also determine the candidate location of the DMRS within the subframe, and send an indication of the candidate location to the user equipment.

The base station may then determine and transmit an uplink grant to the user equipment, as shown in step 420. The UL grant may indicate resources in the subframe that are reserved or dedicated for a data transmission in a channel, such as a sPUSCH. In addition, the UL grant may be used to trigger the sending of the UL reference signal from the user equipment. In step 430, the base station may receive from the user equipment an UL reference signal. The UL DMRS is transmitted based on the UL grant being at least partially within the triggering window of the subframe. Upon receiving the data transmission and the UL reference signal, the base station may perform a channel estimation based on the UL reference signal. In step 450, the base station may using the channel estimation to demodulate the data transmission. In other words, the base station may receive the UL data symbols and demodulate them using the channel estimation, or the user equipment may demodulate the data transmission with the channel estimation.

Figure 5:
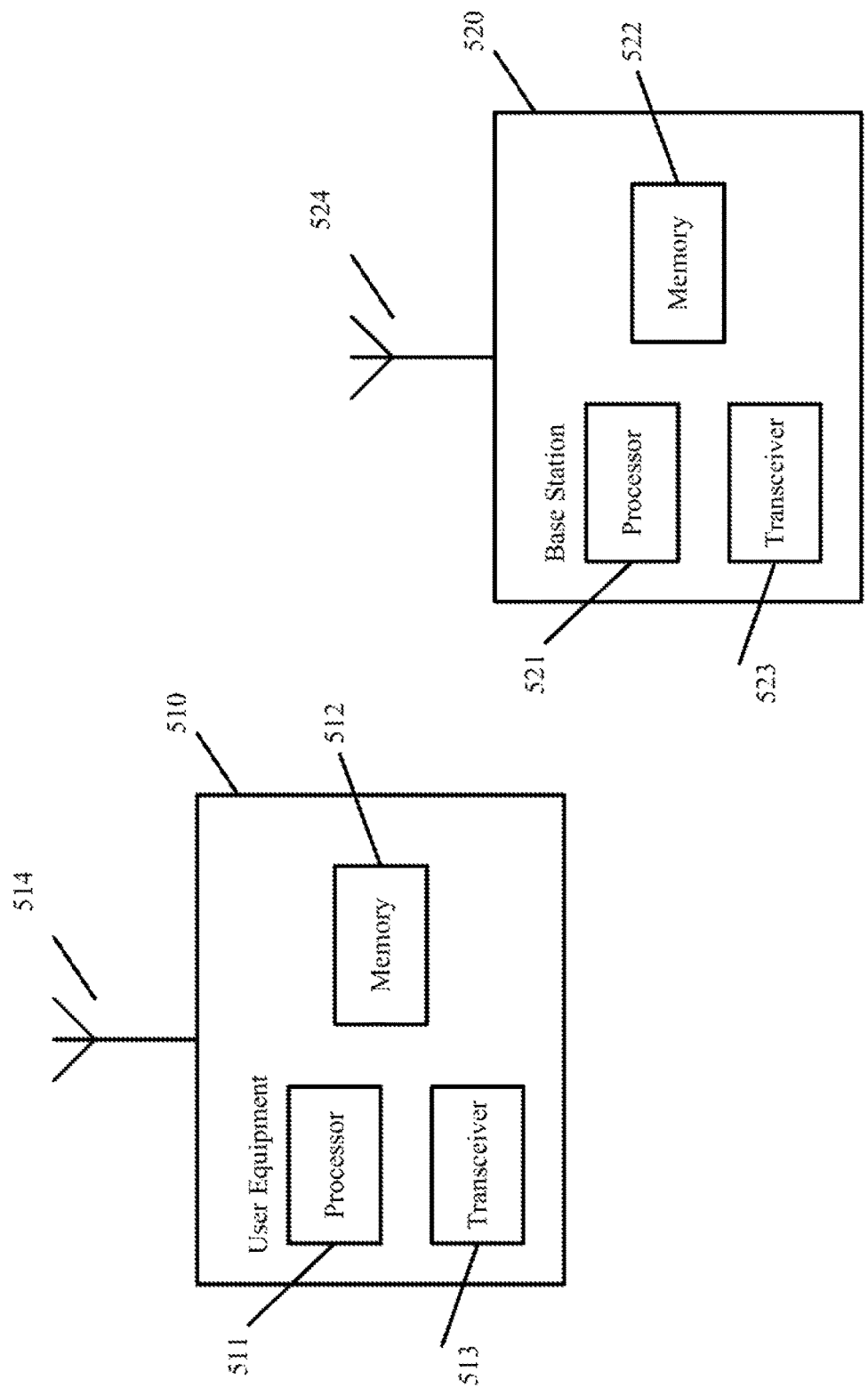
FIG. 5 illustrates a system according to certain embodiments.

FIG. 5 illustrates a system according to certain embodiments. It should be understood that each signal or block in FIGS. 1, 2, 3, and 4 may be implemented by various means or their combinations, such as hardware, software, firmware, one or more processors and/or circuitry. In one embodiment, a system may include several devices, such as, for example, base station 520 or UE 510. The system may include more than one UE 510 and more one base station 520, although only one access node shown for the purposes of illustration. The base station may also be a network node, access node, a 5GNB, an eNB, server, host, or any of the other access or network node discussed herein.

Each of these devices may include at least one processor or control unit or module, respectively indicated as 511 and 521. At least one memory may be provided in each device, and indicated as 512 and 522, respectively. The memory may include computer program instructions or computer code contained therein. One or more transceiver 513 and 523 may be provided, and each device may also include an antenna, respectively illustrated as 514 and 524. Although only one antenna each is shown, many antennas and multiple antenna elements may be provided to each of the devices. Other configurations of these devices, for example, may be provided. For example, network entity 520 and UE 510 may be additionally configured for wired communication, in addition to wireless communication, and in such a case antennas 514 and 524 may illustrate any form of communication hardware, without being limited to merely an antenna.

Transceivers 513 and 523 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

A user device or user equipment 510 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. In other embodiments, the user equipment may be replaced with a machine communication device that does not require any human interaction, such as a sensor or a meter.

In some embodiments, an apparatus, such as a network entity, may include means for carrying out embodiments described above in relation to FIGS. 1, 2, 3, and 4. In certain embodiments, at least one memory including computer program code can be configured to, with the at least one processor, cause the apparatus at least to perform any of the processes described herein.

According to certain embodiments, an apparatus 510 may include at least one memory 512 including computer program code, and at least one processor 511. The at least one memory 512 and the computer program code may be configured, with the at least one processor 511, to cause the apparatus 510 at least to determine by a user equipment a candidate location of a transmission of an uplink reference signal in a channel. The at least one memory 512 and the computer program code may also be configured, with the at least one processor 511, to also cause the apparatus 510 at least to determine by the user equipment a triggering window associated with the candidate location of the transmission of the uplink reference signal in the channel. In addition, the at least one memory 512 and the computer program code may be configured, with the at least one processor 511, to cause the apparatus 510 at least to receive an uplink grant for a data transmission from a base station. Further, the at least one memory 512 and the computer program code may be configured, with the at least one processor 511, to cause the apparatus 510 at least to transmit the uplink reference signal based on the uplink grant being at least partially within the triggering window.

According to certain embodiments, an apparatus 520 may include at least one memory 522 including computer program code, and at least one processor 521. The at least one memory 522 and the computer program code may be configured, with the at least one processor 521, to cause the apparatus 520 at least to determine by a base station a triggering window associated with a candidate location of a transmission of an uplink reference signal in a channel. The shift may cause a duplex distance between the downlink channel and an uplink channel to change. The at least one memory 522 and the computer program code may also be configured, with the at least one processor 521, to also cause the apparatus 520 at least to transmit from the base station to a user equipment an uplink grant for a data transmission. In addition, the at least one memory 522 and the computer program code may be configured, with the at least one processor 521, to cause the apparatus 520 at least to receive the data transmission and the uplink reference signal from the user equipment. The uplink reference signal is transmitted based on the uplink grant being at least partially within the triggering window. Further, the at least one memory 522 and the computer program code may be configured, with the at least one processor 521, to cause the apparatus 520 at least to perform a channel estimation based on the uplink reference signal. The at least one memory 522 and the computer program code may be configured, with the at least one processor 521, to cause the apparatus 520 at least to use the channel estimation to demodulate the data transmission.

Processors 511 and 521 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 512 and 522 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network entity 520 or UE 510, to perform any of the processes described above (see, for example, FIGS. 1, 2, 3, and 4). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

Furthermore, although FIG. 5 illustrates a system including a network entity 520 and UE 510, certain embodiments may be applicable to other configurations, and configurations involving additional elements, as illustrated and discussed herein. For example, multiple user equipment devices and multiple network entities may be present, or other nodes providing similar functionality, such as nodes that combine the functionality of a user equipment and an network entity, such as a relay node. The UE 510 may likewise be provided with a variety of configurations for communication other than communication network entity 520. For example, the UE 510 may be configured for device-to-device communication.

The above embodiments provide for improvements to the functioning of a network and/or to the functioning of the nodes or computers within the network, or the user equipment communicating with the network. Specifically, certain embodiments allow for minimizing UL DMRS overhead. The above embodiments may also avoid adding bits for UL DMRS indication into the UL grant. In addition, the embodiments allow for a constant number of data symbols per sPUSCH transmission, and a constant number of sTTIs within the UL subframes. Certain embodiments may also avoid the high resource usage associated with dynamic signaling.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. While some embodiments may be directed to an LTE environment, other embodiments can be directed to other 3GPP technology, such as LTE advanced or 5G technology.

Partial Glossary

3GPP Third Generation Partnership Program

DCI Downlink Control Information

DFT-S-OFDM Discrete Fourier Transform Spread OFDM

DL Downlink

DMRS Demodulation Reference Signal eNB Enhanced NodeB

HARQ Hybrid Automatic Retransmission request

LTE Long Term Evolution

OFDM Orthogonal Frequency Division Multiplexing

PCFICH Physical Control Format Indicator Channel

PDCCH Physical Downlink Control Channel

PDSCH Physical Downlink Shared Channel
PUCCH Physical Uplink Control Channel
PUSCH Physical Uplink Shared Channel
SRS Sounding Reference Signal
sTTI Short TTI
sPUSCH Short PUSCH
UCI Uplink Control Information
UE User Equipment
UL Uplink
ULRSW Uplink Reference signal window (also DMRS transmission triggering window)

We claim:

1. An apparatus comprising: at least one processor; and at least one memory including computer program code, wherein the at least one memory and the computer program code are configured to, with the at least one processor, cause the apparatus at least to:
determine a candidate location of a transmission of an uplink reference signal in a channel, among a plurality of predetermined candidate locations, each candidate location associated with a triggering window;
determine the triggering window associated with the candidate location of the transmission of the uplink reference signal in the channel;
receive an uplink grant for a data transmission from a base station, wherein the data transmission occurs on a short physical uplink shared channel; and
transmit the uplink reference signal, based on the uplink grant being at least partially within the triggering window associated with the candidate location; and
transmit the data using resources allocated by the uplink grant.

2. The apparatus according to claim 1, wherein the uplink reference signal is an uplink demodulation reference signal or an uplink sounding reference signal.

3. The apparatus according to claim 1, wherein the uplink reference signal is transmitted during a short transmission time interval.

4. The apparatus according to claim 1, wherein the at least one memory and the computer program code are further configured to, with the at least one processor, cause the apparatus to:
receive from the base station information related to the candidate location of the transmission of the uplink reference signal in the channel.

5. The apparatus according to claim 4, wherein the information is received via a radio resource control signal.

6. The apparatus according to claim 1, wherein the at least one memory and the computer program code are further configured to, with the at least one processor, cause the apparatus to:
receive from the base station information related to at least one of a duration of the triggering window or a location of the triggering window.

7. The apparatus according to claim 6, wherein the information is received via a radio resource control signal.

8. The apparatus according to claim 1, wherein the candidate location is predetermined by a standard.

9. The apparatus according to claim 1, wherein the candidate location is a Discrete Fourier Transform Spread orthogonal frequency division multiplexing symbol in a subframe.

10. The apparatus according to claim 1, wherein the triggering window includes at least one orthogonal frequency division multiplexing symbol in a subframe or at least one short transmission time interval.

11. The apparatus according to claim 1, wherein the triggering window includes at least one orthogonal frequency division multiplexing symbol in a subframe before or after the candidate location.

12. An apparatus comprising:
at least one processor; and
at least one memory including computer program code,
wherein the at least one memory and the computer program code are configured to, with the at least one processor, cause the apparatus at least to:
determine a triggering window associated with a candidate location of a transmission of an uplink reference signal in a channel among a plurality of predetermined candidate locations, each candidate location being associated with a triggering window;
transmit to a user equipment an uplink grant for a data transmission, wherein the data transmission occurs on a short physical uplink shared channel;
receive the data transmission and the uplink reference signal from the user equipment, wherein the uplink reference signal is transmitted, based on the uplink grant being at least partially within the triggering window associated with the candidate location;
perform a channel estimation based on the uplink reference signal; and
use the channel estimation to demodulate the data transmission.

13. The apparatus according to claim 12, wherein the uplink reference signal is an uplink demodulation reference signal or an uplink sounding reference signal.

14. The apparatus according to claim 12, wherein the at least one memory and the computer program code are further configured to, with the at least one processor, cause the apparatus to:
determine at the base station information related to the candidate location of the transmission of the uplink reference signal in the channel.

15. The apparatus according to claim 14, wherein the information is transmitted via a radio resource control signal.

16. The apparatus according to claim 12, wherein the at least one memory and the computer program code are further configured to, with the at least one processor, cause the apparatus to:
determine at least one of a duration of the triggering window or a location of the triggering window.

17. The apparatus according to claim 16, wherein the information is transmitted via a radio resource control signal.

18. The apparatus according to claim 12, wherein the candidate location is an orthogonal frequency division multiplexing symbol in a subframe.

19. The apparatus according to claim 12, wherein the triggering window includes at least one Discrete Fourier Transform Spread orthogonal frequency division multiplexing symbol in a subframe or at least one short time transmission interval.

20. The apparatus according to claim 12, wherein the triggering window includes at least one orthogonal frequency division multiplexing symbol in a subframe before or after the candidate location.

* * * * *